(12) United States Patent
Rietz

(10) Patent No.: US 6,682,249 B2
(45) Date of Patent: Jan. 27, 2004

(54) RECONNECTABLE BREAKAWAY ROPE SAFETY CONNECTOR

(76) Inventor: Peter W. Rietz, 20 Agate Rd., Silverthorne, CO (US) 80498

( * ) Notice: Subject to any disclaimer, the term of this patent is extended or adjusted under 35 U.S.C. 154(b) by 60 days.

(21) Appl. No.: 10/022,015

(22) Filed: Dec. 14, 2001

(65) Prior Publication Data

US 2002/0076263 A1 Jun. 20, 2002

Related U.S. Application Data

(60) Provisional application No. 60/256,218, filed on Dec. 14, 2000.

(51) Int. Cl.[7] .......................... A44B 13/00; F16B 45/00; F16B 45/06
(52) U.S. Cl. ............. 403/2; 403/DIG. 11; 403/DIG. 3; 403/66; 24/115 F; 24/602; 24/372; 24/375; 24/376; 24/664
(58) Field of Search ............................ 403/11, 210, 62, 403/34, DIG. 11, 369, 2, DIG. 3, 66; 24/371–376, 664, 115 F, 341, 602; 63/3.1

(56) References Cited

U.S. PATENT DOCUMENTS

| | | | | |
|---|---|---|---|---|
| 1,222,217 A | * | 4/1917 | Kuhn | 24/116 R |
| 2,414,945 A | | 1/1947 | Grund | 35/8 |
| 2,592,696 A | | 4/1952 | Hoody | 24/129 |
| 3,348,617 A | * | 10/1967 | Macartney | 169/42 |
| 4,273,371 A | * | 6/1981 | Behnke et al. | 24/116 R |
| 5,195,217 A | | 3/1993 | Arntzen | 24/115 F |
| 5,518,056 A | | 5/1996 | Voss | 160/178.1 |
| 5,564,131 A | * | 10/1996 | Anscher | 24/602 |
| 5,613,656 A | | 3/1997 | Protz, Jr. | 248/74.2 |
| 5,634,244 A | | 6/1997 | Fetsch et al. | 24/115 F |
| 5,675,875 A | | 10/1997 | Servatius | 24/704.1 |
| 5,987,709 A | | 11/1999 | Chou | 24/116 A |
| 5,988,927 A | * | 11/1999 | Pfarr | 24/115 F |
| 6,000,108 A | * | 12/1999 | Roan | 24/600.9 |
| 6,360,404 B1 | * | 3/2002 | Mudge et al. | 24/115 F |
| 6,438,811 B1 | * | 8/2002 | Watanabe | 24/697.2 |

FOREIGN PATENT DOCUMENTS

GB  20 868 A  * 4/1913  .................. 24/341

* cited by examiner

Primary Examiner—Lynne H. Browne
Assistant Examiner—Ernesto Garcia
(74) Attorney, Agent, or Firm—Sheridan Ross P.C.

(57) ABSTRACT

A re-attachable breakaway safety connector is disclosed which is adapted for use with a rope or other objects arranged in at least a substantially linear manner such that when force is provided to the objects, a tensile force is transferred to the connector. The breakaway connector is designed to fail, i.e., the components separate, when the tensile force transferred to the connector exceeds a predetermined level, and may be selectively adjusted to reduce the amount of force required to separate a male and female component of the safety connector.

16 Claims, 12 Drawing Sheets

RECONNECTABLE BREAKAWAY ROPE SAFETY CONNECTOR

This application claims priority of U.S. provisional patent application Ser. No. 60/256,218 having a filing date of Dec. 14, 2000, and is incorporated herein in its entirety by reference.

FIELD OF THE INVENTION

The present invention relates generally to breakaway safety fasteners. More specifically, the present invention relates to breakaway safety fasteners used in association with boundary markers and even more particularly, to re-attachable breakaway connectors for boundary markers along snow skiing trails.

BACKGROUND OF THE INVENTION

At snow skiing resorts, groomed ski trails or "runs" are provided on the face of a mountain or hill to provide routes for skiers to descend from the top of the resort to the bottom. Many of these trails have defined boundaries. The out-of-bounds areas are often too dangerous due to the steep incline or extreme risk of avalanche danger. Further, some of these areas may be outside the ski area's United States Forest Service (U.S.F.S.) permit area. Thus dangers in the out-of-bounds areas may be created by dense timber, steep inclines, insecure foundation for the snow beds causing avalanche concerns, insufficient snow cover, or other hazardous conditions.

In order to prevent skiers from accessing these areas, the defined boundaries are often marked by ropes, fences, or panel sheets fastened to stakes or other secure items, e.g., trees, 4×4's, or other stanchions along the boundary line. The ropes or fences not only mark the boundary, but also provide a visual and limited physical barrier to skiers attempting to travel into the out-of-bounds or closed areas.

Unfortunately, the rigidity of the ropes or fences can cause an abrupt change of velocity of the skier. Thus, skiers may be injured when striking the rope or fence while skiing or snowboarding. The force at which a skier strikes the boundary marker may cause broken bones, severe bruising or even internal injuries or death. Additionally, the abrupt change of velocity may cause injury to the head or neck of the restrained skier. Although generally designed for the skiing industry, it should be appreciated by one skilled in the art that the present invention may be used in any type of setting or industry where a boundary is identified and the potential for any person hitting the boundary at an increased velocity is present.

Thus, a significant need exists for a boundary or closed marker connection system which will provide a visual and limited physical barrier, yet minimize the injuries caused to the skier when encountering the boundary marker or rope closure at a potentially high velocity. The boundary marker connection system or rope closure should be capable of failing at a predetermined level necessary to prevent these injuries, yet providing a necessary resistance to prevent becoming detached or collapsing merely when a skier, snowboarder, or patron brushes it or during high wind conditions. Additionally, it would be desirable to provide a connection system that is capable of failing at a predetermined level but that may be reconnected in a simple and efficient manner. In this way, replacing the boundary marker takes minimal time and has minimal cost. By minimizing the time to replace the boundary, other skiers may be prevented from traveling off of the defined ski trail. Also, the cost of replacing the boundary marker prevents unnecessary cost to the operator of the ski resort.

SUMMARY OF THE INVENTION

It is thus one aspect of the present invention to provide a breakaway safety connector for use with boundary markers and rope closures which addresses the limitations of products currently known in the art by being capable of failing at a predetermined tension level. This aspect may allow for the prevention of serious injury to persons running into the boundary marker or rope closure.

It is another aspect of the present invention to provide a breakaway safety connector for use with boundary markers or rope closures which is capable of being reconnected after failure, and which can thus be used repeatedly. In this way, the boundary marker or rope closure may be replaced with minimal effort and time, thereby providing others with a clear indication of boundary lines.

In yet another aspect of the invention, the device is made of a material which allows a portion of the male end to be reduced in size, and thereby reducing the tensile strength of the connector. This provides the user with a method of selecting the tensile strength desired in the connector by reducing the diameter of the connector along at the male end, thus providing a breakaway connector which can be custom designed for a variety of applications. Alternatively, it is another aspect of the present invention that the female component of the connecting end may be selectively increased in size to reduce the amount of tensile force required to separate the male component and female component.

It is yet another object of the present invention to provide a breakaway safety connector which is not reusable and shatters or breaks during failure when a predetermined amount of force is applied. In all embodiments, a light weight, generally inexpensive apparatus is provided which can substantially reduce the risk of injury or death to someone hitting a rope or other barrier device.

Additional advantages of the present invention will become readily apparent from the following discussion, particularly when taken together with the accompanying drawings.

DETAILED DESCRIPTION

The present invention, including the preferred embodiments, may be seen in FIGS. 1–12, which show a re-attachable breakaway safety connector specifically designed for attachment to a boundary marker or rope closure. The re-attachable breakaway safety connector in one embodiment is generally comprised of two components. Each component has an attachment end for attachment to a boundary marker such as a rope, cable, chain or webbing or any other type of material known in the art which may be used as a boundary material or closure. The two connectors are also capable of being releasably interconnected to one another and, if separated, selectively reconnected.

Figure 1:
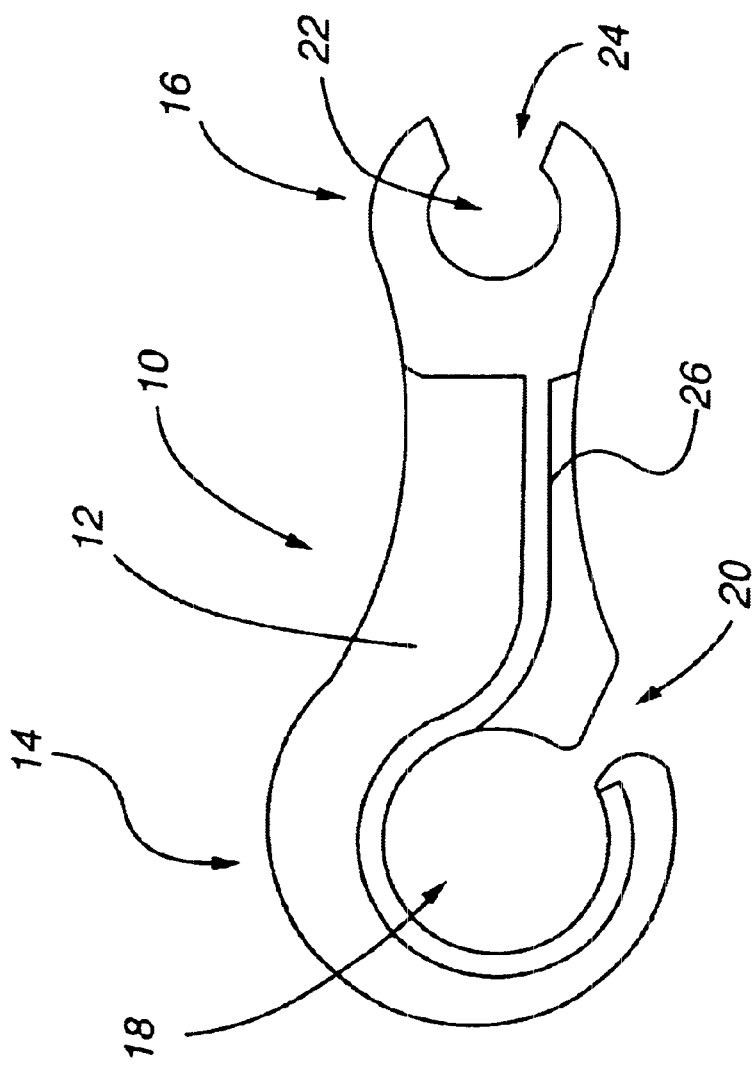
FIG. 1 is a plan view of one embodiment of the female connector portion of the present invention.

With reference to FIG. 1, a female component of the present invention is shown. The female component 10 is comprised of a female component body 12 with an attachment end 14 and a female connector end 16. The attachment end 14 is designed to be connected to a rope or other boundary marker. Thus, the attachment end 14 includes an attachment aperture 18. A rope may be tied or looped to the attachment end 14 of the female component 12 by inserting an end of the rope through the attachment aperture 18 and knotting or looping the rope about the attachment end 14 or the rope itself.

As shown in FIG. 1, the attachment end 14 may also include a passage 20 for receiving the rope, clip or other attachment mechanism. With this feature, a looped end of rope may be attached to the attachment end 14 by sliding the looped end of rope through the passage 20 into the attachment aperture 18. The passage 20 also may accommodate attachment to a chain or other object that cannot be tied to the attachment end 14.

The female connector end 16 of the female body 12 is designed to be connected to the male component, as described below. The female connector end 16 includes a connector socket 22. A connector slot 24 may additionally be provided between an external surface of the female connector end 14 and the connector socket 22.

The female component body 12 may also include a reinforcing ridge 26 along at least a portion of the female component body 12. The reinforcing ridge 26 is a raised portion of the female component body 12 used to provide increased structural integrity to the female component body 12. As shown in FIG. 1, the reinforcing ridge may also extend around at least a portion of the attachment aperture 18 to provide enhanced structural integrity and also to increase the bearing surface of the attachment aperture 18.

Figure 2:
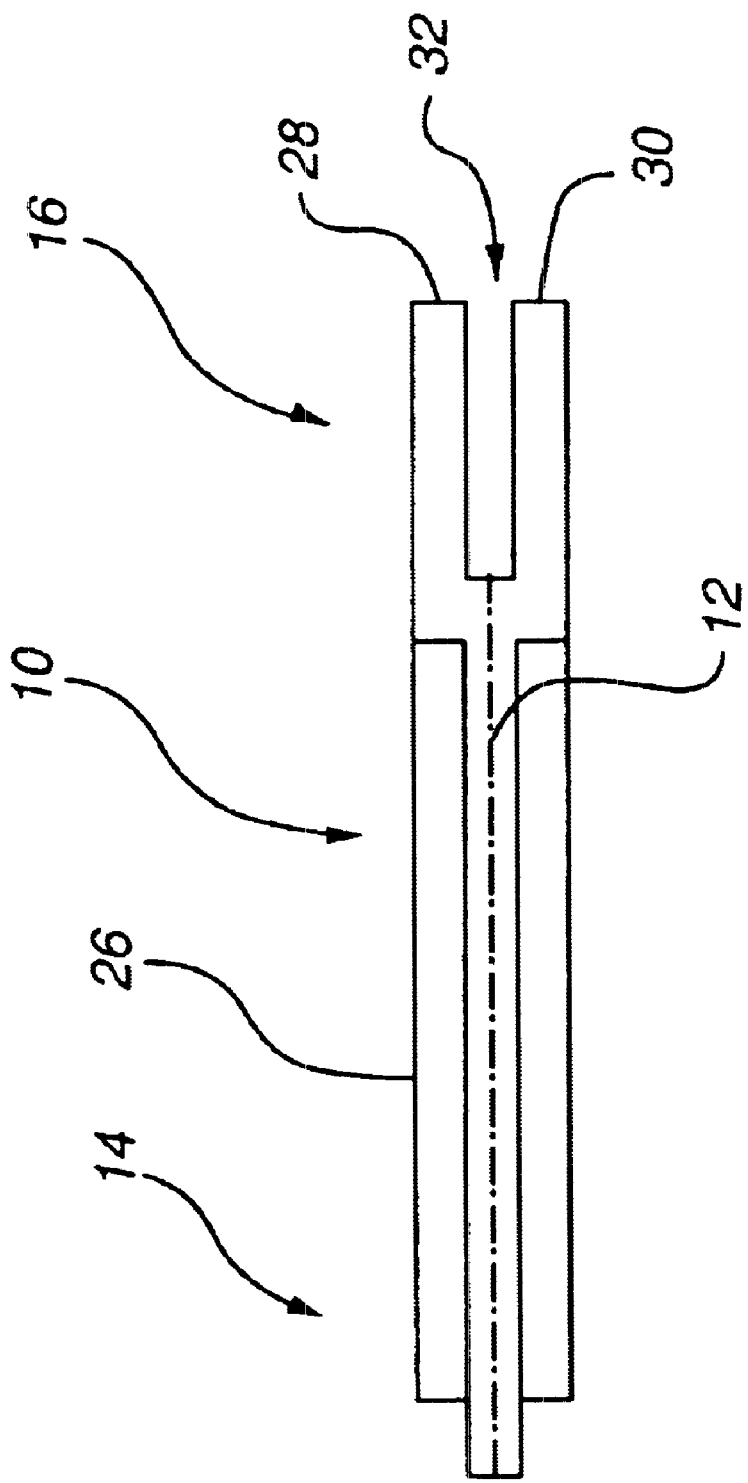
FIG. 2 is a top plan view of the embodiment of the female connector of FIG. 1.
Figure 3:
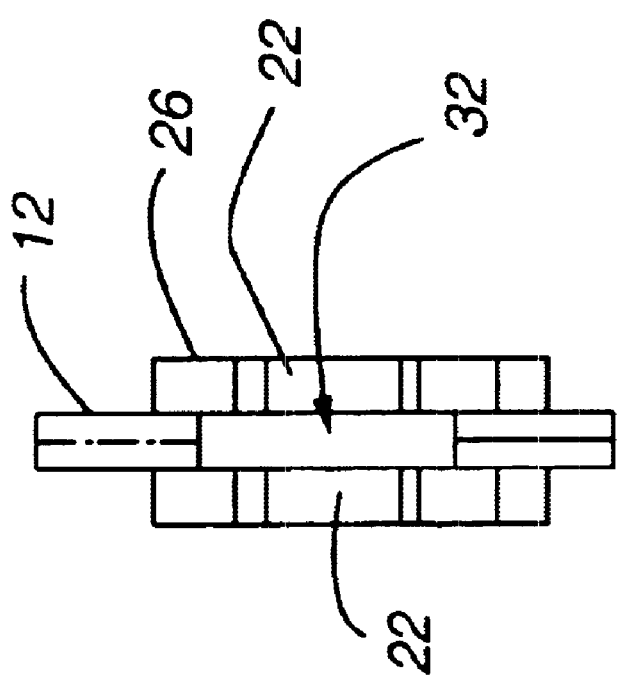
FIG. 3 is an end elevation view of the embodiment of the female connector of FIG. 1.
Figure 4:
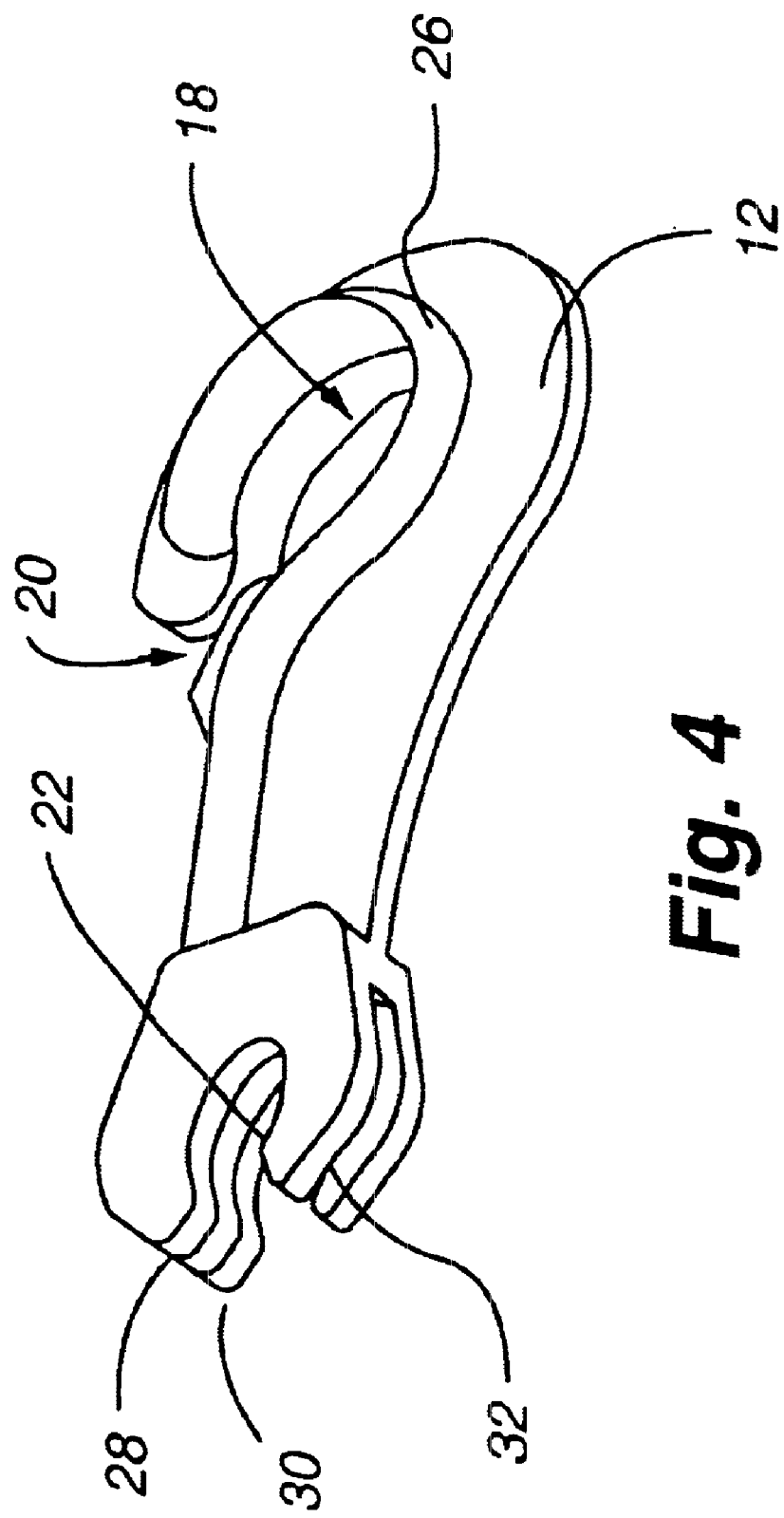
FIG. 4 is a perspective view of the embodiment of the female connector of FIG. 1.

Referring now to FIG. 2, the female component 10 of FIG. 1 is shown in a top plan view. In this embodiment, the female connector end 16 is formed by a first connector arm 28 and a second connector arm 30. The first and second connector arms 28 and 30 define a channel 32 in the female connector end 16. The channel 32 is designed to receive the body of the male component as described below. FIG. 3 shows a right end elevation view of the female component 10 as seen from the female connector end 16. FIG. 4 depicts the female component 10 in an upper perspective view, and which again identifies the first connector arm 28, second connector arm 30 and other components.

Figure 5:
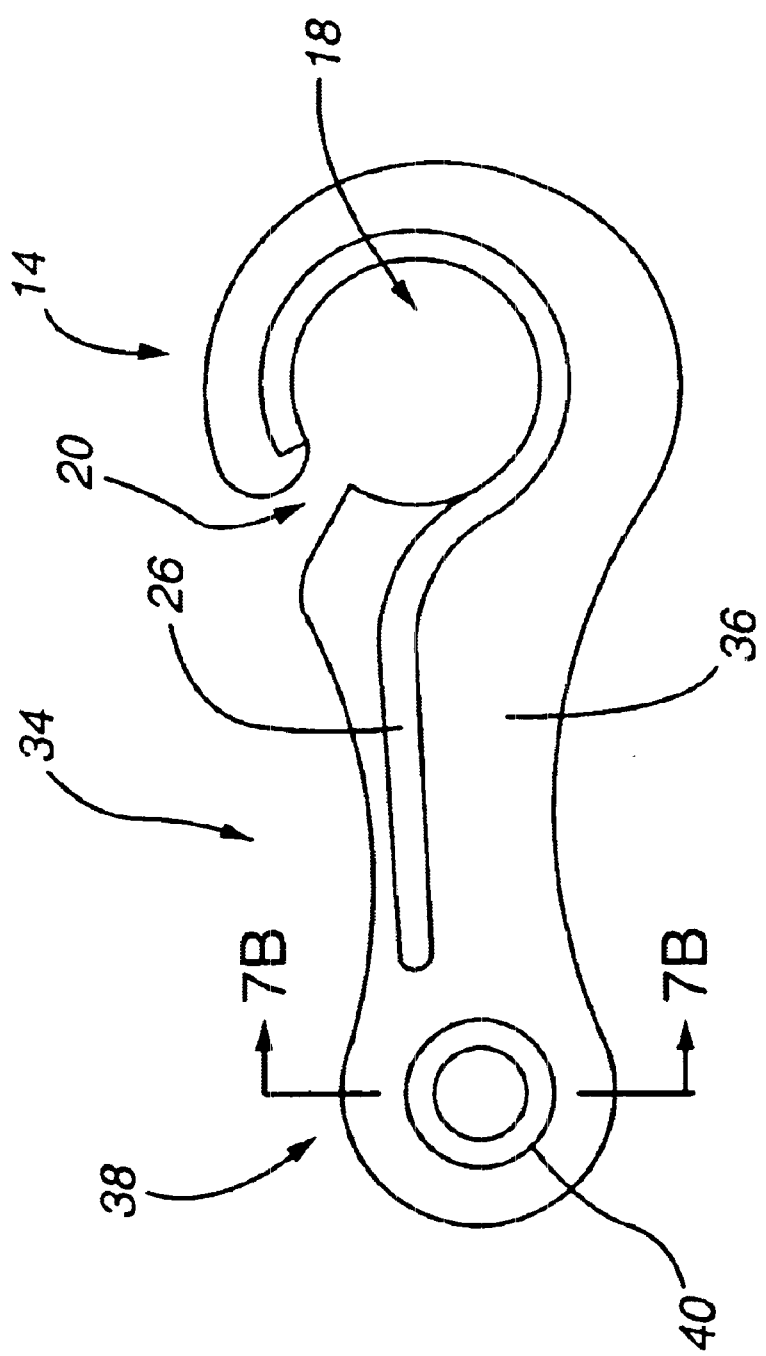
FIG. 5 is a plan view of one embodiment of the male connector portion of the present invention.

Referring now to FIG. 5, one embodiment of a male component of the present invention is shown. The male component 34 is generally comprised of a male component body 36 having a attachment end 14 and a male connector end 38. The attachment end 14 of the male component 34 of this embodiment is generally identical to the attachment end 14 of the female component 10 as described above, and is thus adapted to receive a rope or other type of barrier device.

The male connector end 38 of the male component 34 includes a connector post 40. The connector post 40 is sized to be received into the connector socket 22 of the female component 10. The connector post 40 is a projected area at the male connector end 38 of the male component 34. As shown in FIG. 5, the connector post 40 may be a cylindrical wall with a hollow center. It is understood, however, that a connector post 40 may be comprised of a solid cylinder or other solid or walled geometries. It should also be understood that the connector socket 22 of the female component 10 should have a substantially corresponding and mating geometry, and the two are designed to be engaged with such a high degree of tolerance that it takes a predetermined force to disengage the two components. Thus, high wind, drifting snow and other similar events will not prematurely disengage the connector. As in the female component 10 above, the male component body 36 may include a reinforcing ridge 26 along at least a portion of the male component body 36. Additionally, the reinforcing ridge may also be formed adjacent to the attachment aperture 18 for providing structural rigidity as well as increased bearing surface of the attachment aperture 18. As further appreciated by one skilled in the art, the geometry of the male and female connectors are not critical as long as the two components matingly engage and can be selectively disconnected. Thus these components may be round, oval, peg-shaped, triangular semispherical or any other shape which conceivably can be fit together with male and female components.

Figure 6:
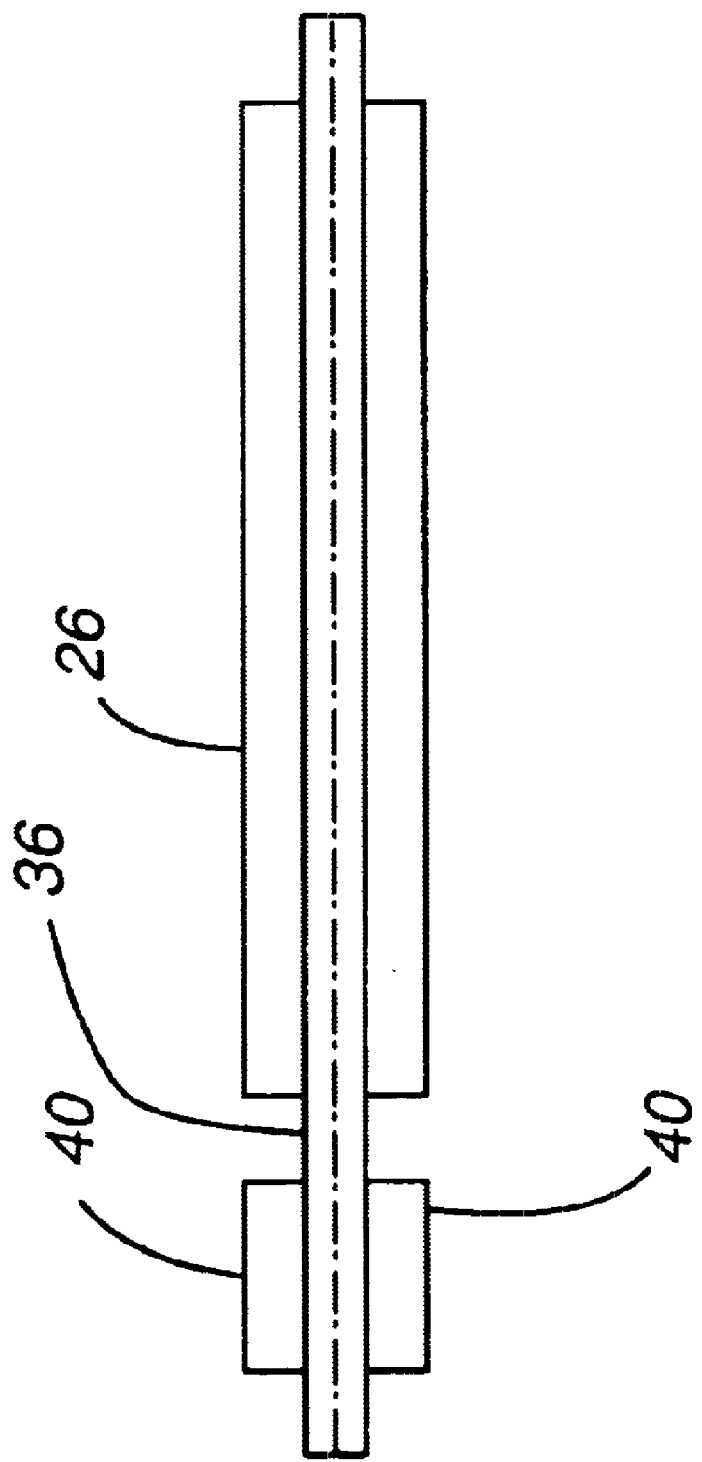
FIG. 6 is a top plan view of the embodiment of the male connector portion of the present invention.

Referring now to FIG. 6, the male component 34 of FIG. 5 is shown in a top plan view. In this embodiment, the connector post 40 is shown extending outwardly from both sides of the male component body 36. It should be understood, however, that other embodiments of the connector post 40 are possible. For example, the connector post may extend from only one side of the male connector body 36, as opposed to both sides. Preferably the connector posts 40 are comprised of a plastic, wood, rubber or other material which can be selectively reduced in size with an abrasive material such as sandpaper or rasping tools to effectively reduce the diameter and selectively reduce the amount of force required to detach the male component 40 from the female connector slot 24.

Figure 7B:
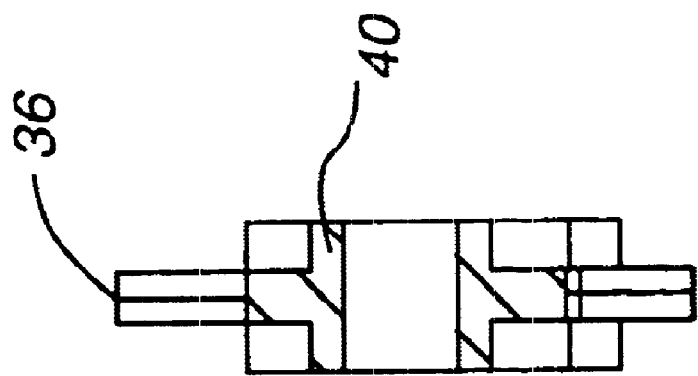
FIG. 7B is a cross-sectional view of the embodiment of the male connector of FIG. 5 along section line A—A.
Figure 7A:
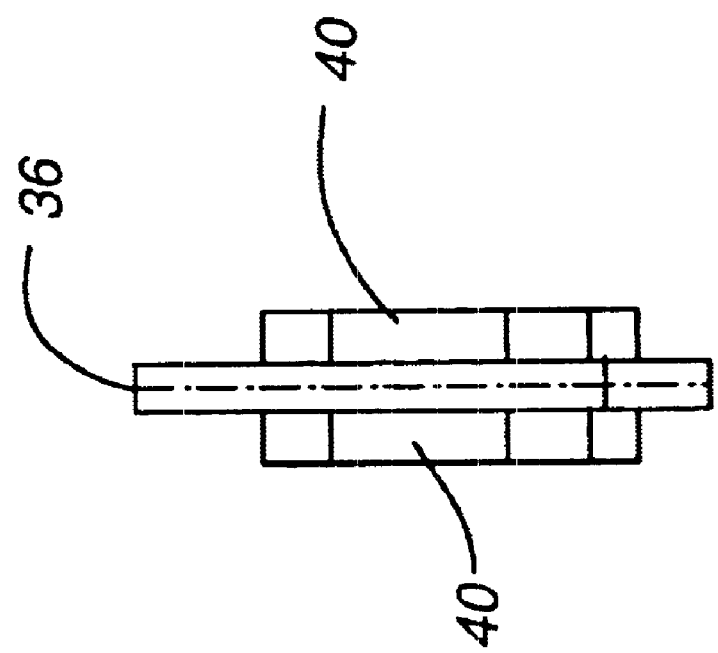
FIG. 7A is an end elevation view of the embodiment of the male connector portion of the present invention.
Figure 8:
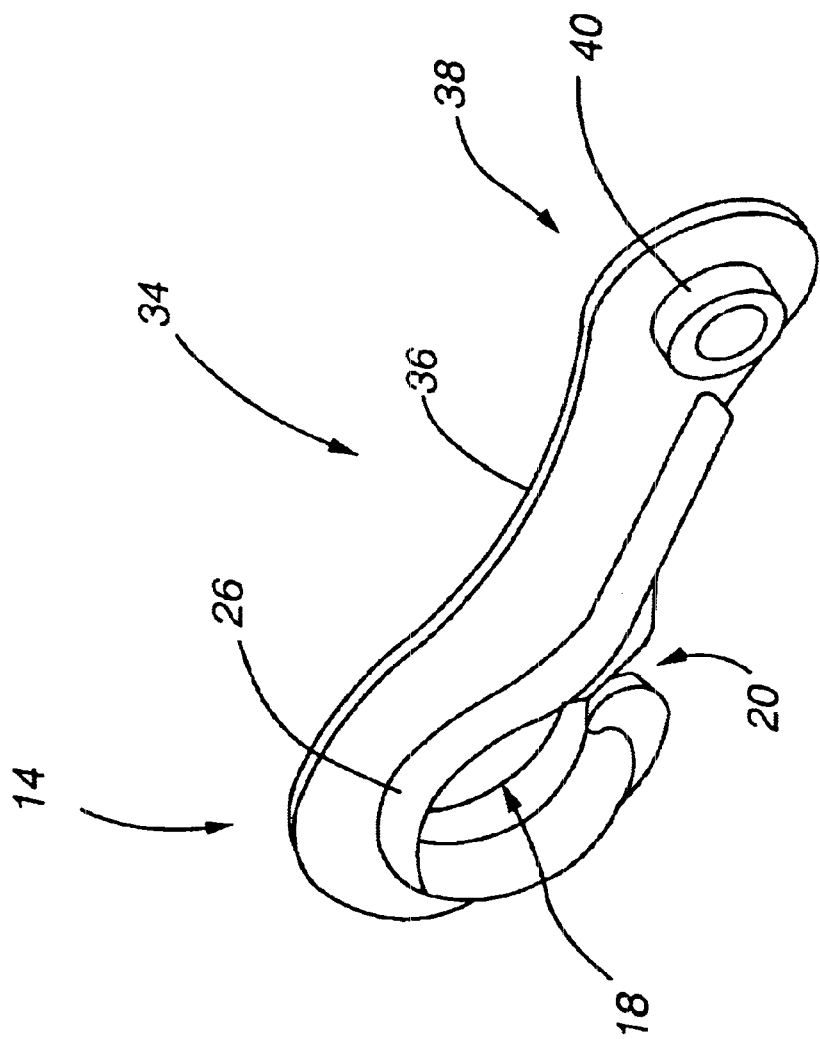
FIG. 8 is a perspective view of the embodiment of the male connector portion of the present invention.

With reference to FIG. 7A, the male component 34 is shown in a right end elevation view as viewed from the male connector end 38. Similarly, FIG. 7B shows a cross section of the male component 34 as seen from cross section A—A as indicated in FIG. 5. With reference to FIG. 8, the male component 34 is shown in a front perspective view.

Figure 9:
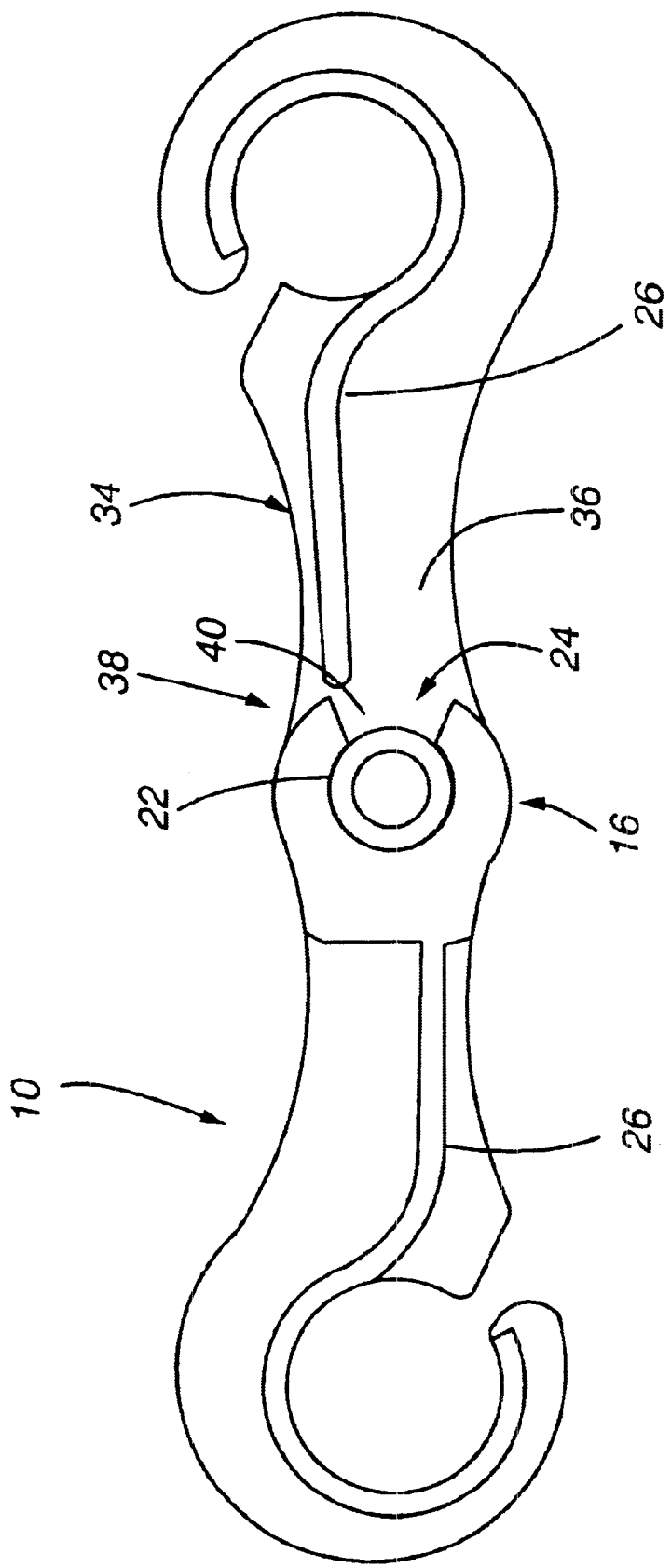
FIG. 9 is a side elevation view of one embodiment of the re-attachable breakaway connector of the present invention with the embodiment of the female connector of FIG. 1 and the embodiment of the male connector of FIG. 5.

Referring now to FIG. 9, one embodiment of the breakaway connector 42 of the present invention is shown with the corresponding male and female connections releasably interconnected. The breakaway connector 42 is the combination of a female component 10 and a male component 34 of the present invention as described above. The portion of the male component body 36 adjacent to the connecting post 40 is inserted into the connector slot 24 of the female component 10 such that the connecting post 40 is seated within the attachment aperture 18. Once property inserted, the connection of the female component 10 and the male component 34 require a predetermined tension level to be separated again. As shown in FIG. 9, the reinforcing ridge 26 of the male component 34 may be abbreviated such that the male connector end 38 may be rotated within the female connector end 16 such that the reinforcing ridge 26 does not interfere with the female connector end 16.

The breakaway connector 42, and all components and pieces thereof, may be formed of substantially any material. It is desirable, however, that the material used for the connector 42 have some resilience and elasticity such that when the necessary tensile force is applied, the first and second connector arms 28 and 30 expand to allow disconnection with the connector post 40 without structural damage. Some such materials may include, but are not limited to rubber, nylon, polyvinyl chloride, polypropylene, polypropylene, polyethylene, or other plastics known in the art. Alternatively, certain metallic materials such as stainless steel may be suitable for this purpose.

Additionally, the size and shape of the breakaway connector 42 may vary. Thus it is possible to design a breakaway connector 42 with virtually any required tensile strength for failure. However, it is anticipated that the breakaway connector 42 and its component parts should be designed to require a tensile strength of between about 30 and about 50 pounds (lbs), and more preferably about 40 lbs, prior to disengaging the male component 34 from the female component 10.

Figure 10:
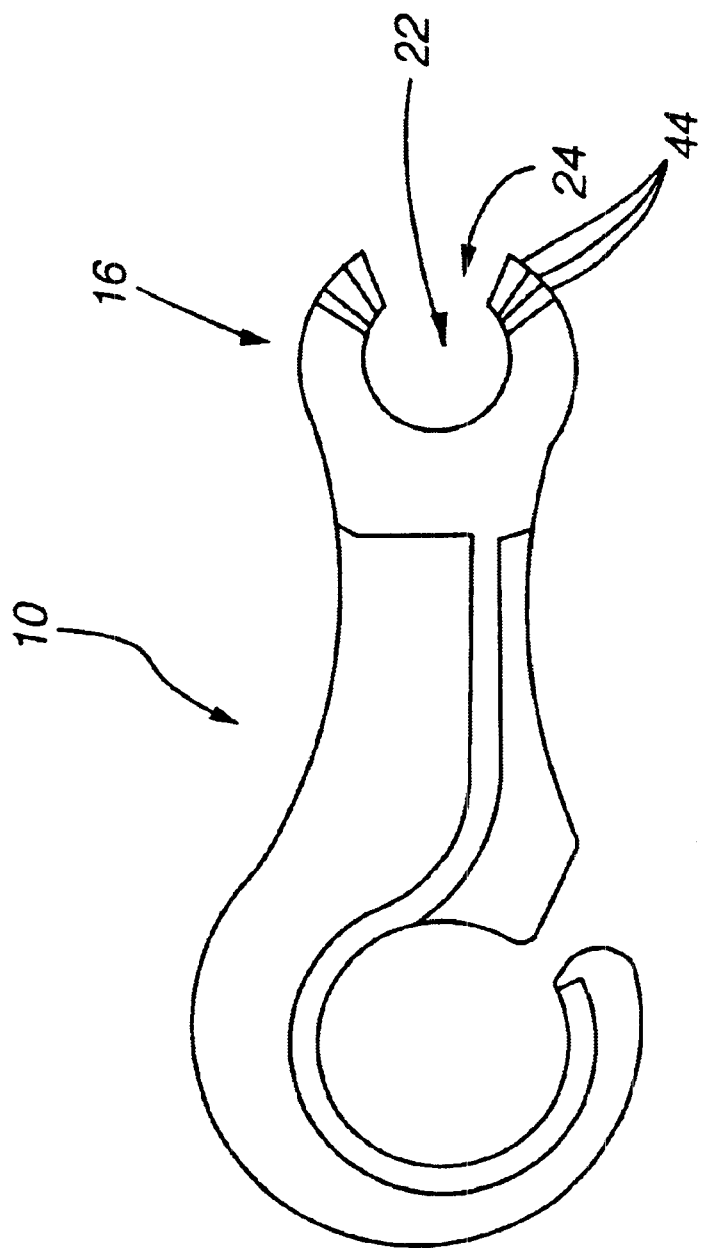
FIG. 10 is a plan view of an alternative embodiment of the female connector of the present invention.
Figure 11:
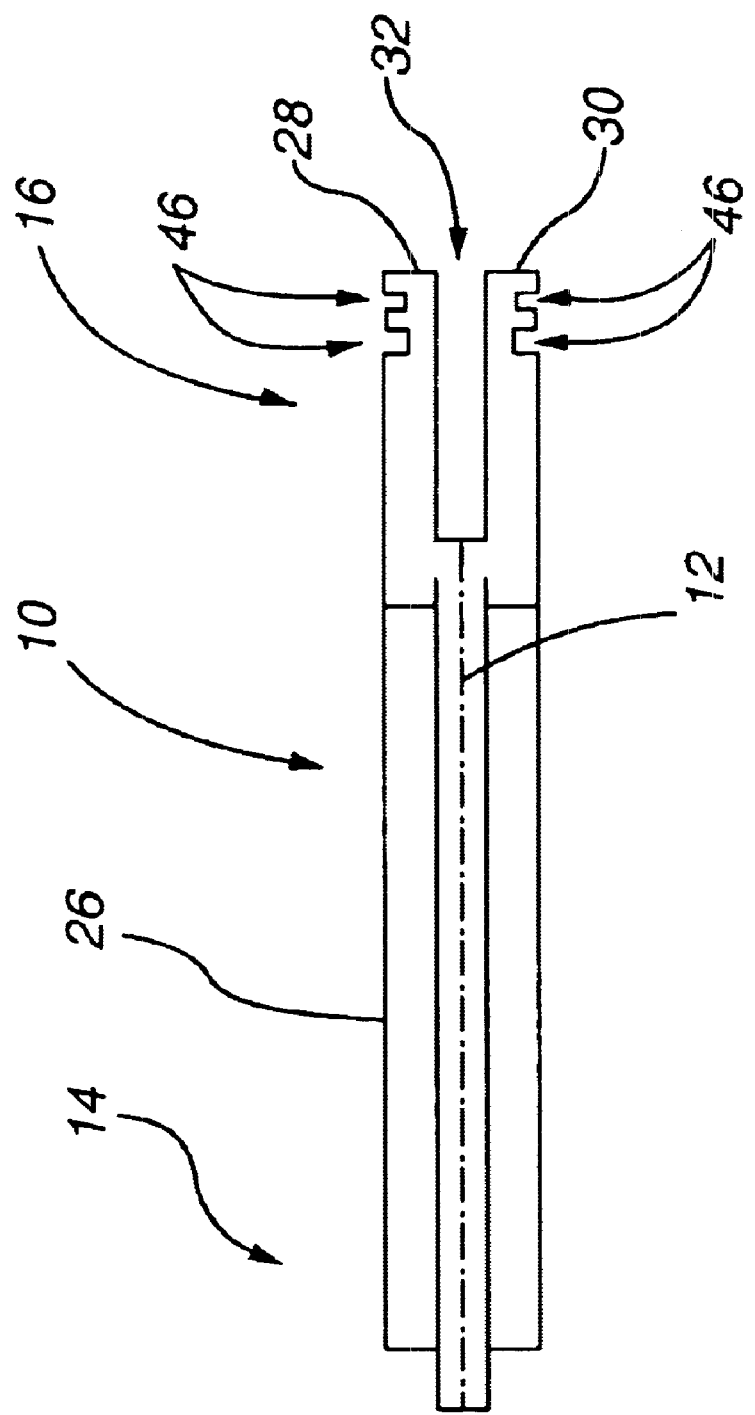
FIG. 11 is side elevation view of the embodiment of the female connector of FIG. 10.

Referring now to FIG. 10, a preferred embodiment of the female connector end 16 is shown. In this embodiment marks 44 are provided on the female connector end 16 to indicate the tension strength of the connection between the female component 10 and the male component 34 if the connector slot is extended to corresponding marks 44. A user may trim the female connector end 16 by removing that portion of the female connector end up to and including the mark 44. In this way, the user may select the proper tension level for a given application. Alternatively, the male connecting posts 40 may be selectively reduced in diameter to reduce the force required to separate the male and female components of the breakaway connector 42. As shown in FIG. 11, the marks may have corresponding grooves 46 such that the user may properly locate a cutting utensil along the mark 44. The grooves 46 simplify the trimming process.

Figure 12:
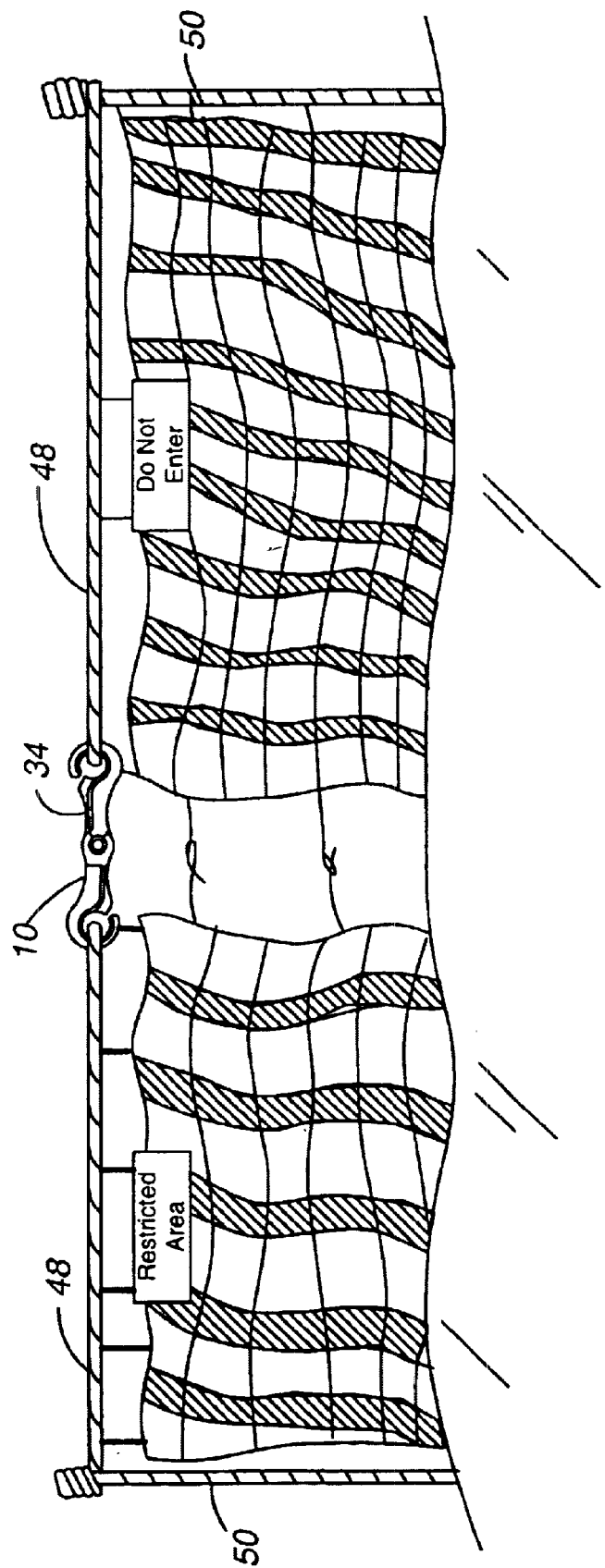
FIG. 12 is a front elevation view depicting the present invention interconnected to a barrier device.

Referring now to FIG. 12, a depiction of the present breakaway connector 42 in use is provided herein. As shown, the breakaway connector 42 is typically interconnected to a rope 48 or other barrier device, which is in turn positioned between two substantially non-movable objects such as trees, rock outcroppings, stanchions 50, or other similar devices or objects.

While various embodiments of the present invention have been described in detail, it is apparent that modifications and adaptations of those embodiments will occur to those skilled in the art. However, it is to be expressly understood that such modifications and adaptations are within the scope and spirit of the present invention, as set forth in the following claims.

What is claimed is:

1. A breakaway connector adapted for interconnection to a restraint device, comprising:

a male component and a female component each having an attachment end, a connector end, and a body portion, with an integral reinforcing ridge positioned therebetween, said attachment end and said connector end, said connector end of said male component and said connector end of said female component capable of being releasably interconnected;

wherein said connector end of said male component further includes a connector post that protrudes generally perpendicular from said body of said male component, and wherein said body portion of said male component and said body portion of said female component are generally parallel to each other when said components are releasably interconnected;

wherein said male component and said female component become disconnected when subjected to a predetermined force acting along a substantially longitudinal axis of either said female component or said male component.

2. The breakaway connector of claim 1, wherein the restraint device is at least one of a rope, a cable, a nylon cord, and a plastic mesh material.

3. The breakaway connector as claimed in claim 1, wherein said predetermined force is a tensile strength of between about 30 and 50 lbs.

4. The breakaway connector as claimed in claim 3, wherein said attachment end is adapted for interconnection to the restraint device.

5. The breakaway connector of claim 1, wherein said male component or said female component maybe selectively adjusted to modify the amount of force required to release said male component from said female component.

6. The breakaway connector of claim 1, wherein at least a portion of said female component comprises a plurality of removable tabs which can be selectively removed.

7. The breakaway connector of claim 1, wherein said male component and said female component are constructed of at least one of a rubber, a plastic, a wood or a metal material.

8. The breakaway connector of claim 1, wherein said male component further comprises a post which is at least substantially cylindrical at said connector end.

9. The breakaway connector of claim 8, wherein said post may be selectively reduced in diameter to reduce an amount of force required to disconnect said connector end of said male component and said connector end of said female component.

10. The breakaway connector of claim 1, wherein said female component further comprises a socket which is at least partially circular, such that said male component and said female component may be releasably interconnected by engaging said socket into a post interconnected to said male component.

11. An apparatus adapted for selectively releasing a restraint device from at least one substantially non-moving object, comprising:

a male component having an attachment end adapted for interconnection to the restraint device, a connector end having at least a first male portion extending therefrom, a generally planar body portion, with an integral reinforcing ridge positioned between said attachment end and said connector end of said male component;

a female component having an attachment end adapted for interconnection to a second portion of the restraint device, a connector end having at least a first female portion which is releasably interconnected to said first male portion, and which releases from said at least first male portion when a predetermined force is applied to the restraint device and said apparatus, and a generally planar body segment, with an integral reinforcing ridge positioned between said attachment end and said connector end of said female component, wherein said body portion of said male component and said body portion of said female component are generally parallel to each other when said components are releasably interconnected.

12. The apparatus of claim 11, wherein said first male portion has a shape which is substantially cylindrical.

13. The apparatus of claim 11, wherein said attachment end of said male component and said female component is substantially a hook.

14. The apparatus of claim 11, wherein at least one of said at least a first male portion or said at least a first female portion may be selectively altered to decrease the amount of force required to release said at least a first male portion from said at least a first female portion.

15. A breakaway connector adapted for interconnection to a restraint device, comprising:

a male component and a female component each having an attachment end and a connector end, said connector end of said male component and said connector end of said female component capable of being releasably interconnected, wherein at least a portion of said female component comprises a plurality of removable tabs that can be selectively removed;

wherein said male component and said female component become disconnected when subjected to a predetermined force acting along a substantially longitudinal axis of either said female component or said male.

16. An apparatus adapted for selectively releasing a restraint device from at least one substantially non-moving object, comprising:

a male component having a hook-shaped attachment end adapted for interconnection to the restraint device and a connector end having at least a first male portion extending therefrom;

a female component having a hook-shaped attachment end adapted for interconnection to a second portion of the restraint device and a connector end having at least a first female portion which is removably interconnected to said first male portion, and which releases from said at least first male portion when a predetermined force is applied to the restraint device and said apparatus.

* * * * *